(12) United States Patent
Pajjuri et al.

(10) Patent No.: US 8,379,629 B2
(45) Date of Patent: Feb. 19, 2013

(54) DATA SESSION HANDLING

(75) Inventors: Ambika Pajjuri, Palo Alto, CA (US); Scott Fullam, Palo Alto, CA (US)

(73) Assignee: 2Wire, Inc., San Jose, CA (US)

( * ) Notice: Subject to any disclaimer, the term of this patent is extended or adjusted under 35 U.S.C. 154(b) by 265 days.

(21) Appl. No.: 12/710,277

(22) Filed: Feb. 22, 2010

(65) Prior Publication Data

US 2011/0206054 A1 Aug. 25, 2011

(51) Int. Cl.
*H04L 12/28* (2006.01)

(52) U.S. Cl. ........................................ 370/351; 370/401

(58) Field of Classification Search .......... 370/351–356, 370/400, 401
See application file for complete search history.

(56) References Cited

U.S. PATENT DOCUMENTS

| 7,372,955 B1 | 5/2008 | Ryder et al. | |
| 2007/0286160 A1* | 12/2007 | Gorti et al. | 370/352 |
| 2007/0286170 A1* | 12/2007 | Khan et al. | 370/356 |
| 2008/0291930 A1* | 11/2008 | Damola et al. | 370/401 |
| 2009/0016324 A1* | 1/2009 | Prouvost et al. | 370/352 |
| 2009/0019141 A1* | 1/2009 | Bush et al. | 709/223 |
| 2009/0197594 A1* | 8/2009 | Chintada et al. | 455/426.2 |

OTHER PUBLICATIONS

"Xtreme Technologies Xlink Cellular Bluetooth Gateway," CBS Interactive, May 31, 2007, downloaded from http://reviews.cnet.com/cell-phone-and-smart/xtreme-technologies-xlink-cellular/4505-6448_7-32462813.html?tag=mncol;lst#cnetReview, Sep. 9, 2009, 3 pages.

Cericola, Rachel, "Xtreme Ties Cell to Home Phone," EH Publishing, Nov. 13, 2008, downloaded from http://www.electronichouse.com/article//xtreme_ties_cell_to_home_phone/, Sep. 9, 2009, 3 pages.

Fitchard, Kevin, "CTIA: AirWalk linking the enterprise PBX to the femtocell," Penton Media, Inc., Mar. 18, 2009, downloaded from http://www.telephonyonline.com/wireless/news/airwalk-communications-femtocell-0318/index.html, Sep. 9, 2009, 2 pages.

"SIP-based 3G Femtocells," Broadsoft, Inc., 2009, downloaded from http://www.broadsoft.com/technology/network-architecture/mobile-wireless/sip-based-3g-femtocells/, Sep. 9, 2009, 2 pages.

* cited by examiner

*Primary Examiner* — Hong Cho
(74) *Attorney, Agent, or Firm* — Head, Johnson & Kachigian, P.C.

(57) ABSTRACT

A method and apparatus to transfer a data session from one device connected to a residential gateway to another. The transfer is completed within the residential gateway, without routing data through the service provider's network. In one embodiment, a native address of a communication device engaged in an active data session is stored in a memory as a temporary device address. A session address in memory is set equal to the stored temporary device address and the temporary device address is associated with the session address in memory. When a request to transfer the data session to another device is received, the temporary device address in memory set to the native address of the new communication device and the session history is sent to the new device. Any new data received in the session, intended for the original device, is routed by a data session handling engine to the new communication device.

23 Claims, 6 Drawing Sheets

DATA SESSION HANDLING

TECHNICAL FIELD

This disclosure relates to the field of telecommunications and, in particular, to handling a communication session by a residential gateway.

BACKGROUND

Typically, telecommunication systems used to provide broadband access to residential customers contain a residential gateway which consists of an xDSL (any type of digital subscriber line) modem combined with various local area networking (LAN) technologies to enable sharing the broadband access with other computers or devices within the residence. 802.11 wireless and home phone line networking (HPNA) are examples of LAN technologies. In addition, some telecommunication systems may provide a voice-over-internet-protocol (VOIP) feature to allow telephone calls via the broadband link.

Some systems may further include a femtocell base station capable of establishing relatively small wireless network coverage area. Additionally, the residential gateway may further include the features of an Internet Protocol Private Branch Exchange (IP-PBX) to make connections among the devices connected to the residential gateway. The IP-PBX handles voice signals under an Internet protocol and can exist as physical hardware or can carry out its functions virtually, performing the call-routing activities using a software system.

Typically, the residential gateway is located inside a house and connects a number of devices to one or more service provider's core networks. There are, however, several disadvantages with a conventional residential gateway having the features described above. In a conventional residential gateway, any transfer of a voice session between mobile cell phones or between Digital Enhanced Cordless Telecommunications (DECT) phones must be routed through the service provider's core network. This can add significant cost and delay and may be impossible if the service provider's network does not support the requested transfer function. Additionally call transfer between a mobile cell phone and a DECT phone does not exist. Furthermore, conventional residential gateways require each connection to be specifically formatted and do not support the transfer of data sessions, such as short message service (SMS) or instant message (IM) traffic.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

Embodiments of a method and apparatus are described to transfer a data session from one device connected to a residential gateway to another. The transfer may be completed within the residential gateway, without routing data through the service provider's network. In one embodiment, a native address of a communication device engaged in an active data session is stored in a memory as a temporary device address. A session address in memory is set equal to the stored temporary device address and the temporary device address is associated with the session address in memory. When a request to transfer the data session to another device is received, the temporary device address in memory set to the native address of the new communication device and the session history is sent to the new device. Any new data received in the session, intended for the original device, is routed by a data session handling engine to the new communication device.

Figure 1:
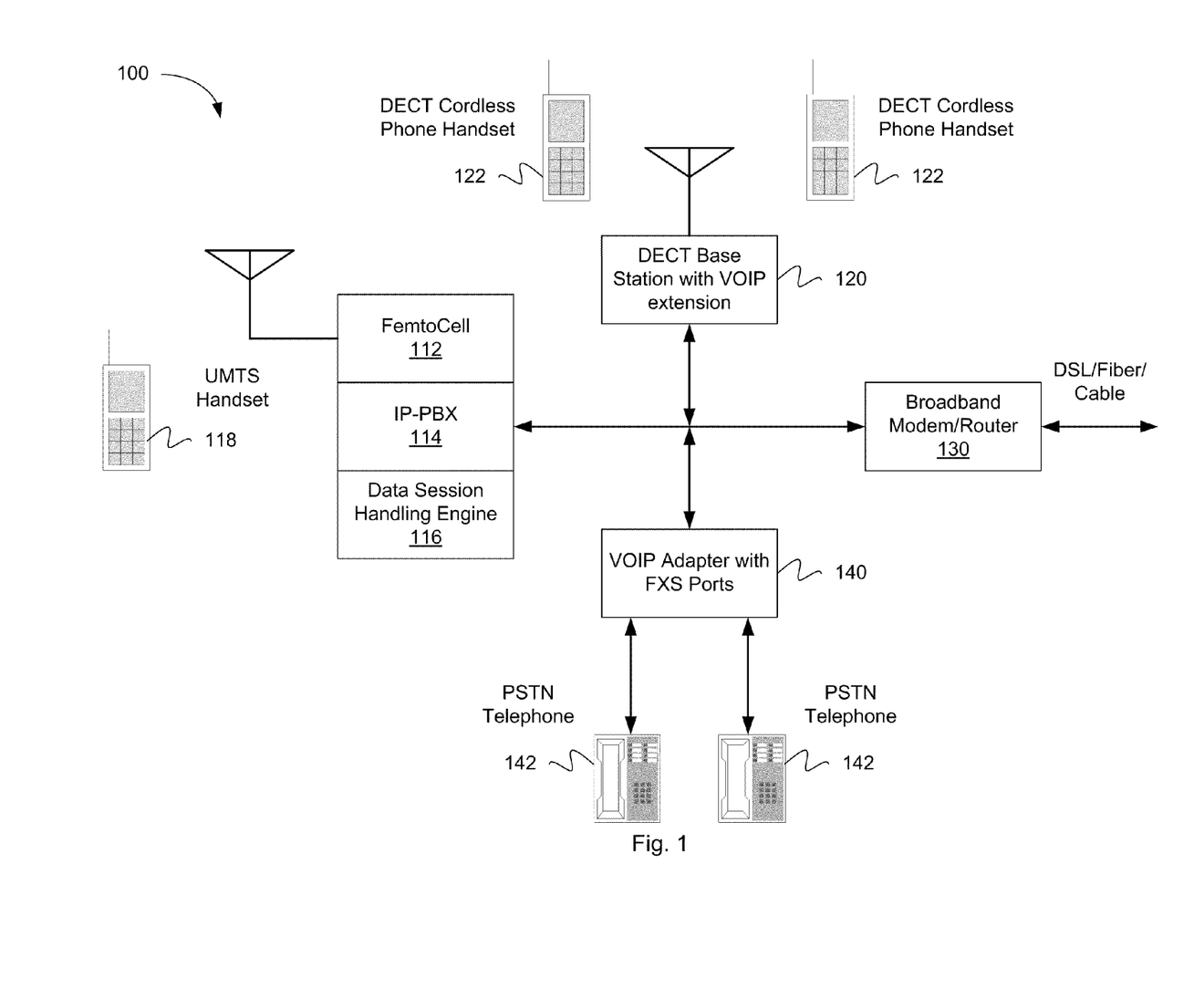
FIG. 1 is a block diagram illustrating a residential gateway according to an embodiment.

FIG. 1 is a block diagram illustrating a residential gateway 100 according to an embodiment of the present invention. The residential gateway 100 may include a femtocell 112, an Internet Protocol Private Branch Exchange (IP-PBX) module 114, and a data session handling engine 116. In some situations, it may be desirable to deploy a femtocell wireless base station 112 capable of establishing a relatively small network coverage area. The femtocell wireless base station may be a less sophisticated and a less costly device that is designed to provide wireless telephone network coverage to a few mobile devices (e.g., 4 to 6 simultaneous mobile devices) rather than the large numbers (e.g., 100+simultaneous mobile devices) provided by a conventional network telecommunications system. The coverage area of the femtocell wireless base station 112 is also designed to be small compared with that of conventional network infrastructure, for example, limited to the size of a home or an office versus a coverage area of several densely populated city blocks, or rural coverage expanding over potentially hundreds of acres. In one embodiment, a Universal Mobile Telecommunications System (UMTS) handset 118 or other mobile cell phone can connect wirelessly to the residential gateway 100 through femtocell 112. The connection may be made using either the licensed or unlicensed spectrum of electromagnetic waves.

The IP-PBX module 114 coordinates communication among the devices connected to the residential gateway, such as for example, a UMTS handset 118, a Digital Enhanced Cordless Telecommunications (DECT) handset 122 or a public switched telephone network (PSTN) telephone 142. The IP-PBX module 114 handles voice and data signals under Internet protocol and can exist as physical hardware or can carry out its functions virtually, performing the call-routing activities as a software system. Functionally, the IP-PBX module 114 can establish connections between the devices, maintain such connections as long as the user requires them, disconnect those connections as per the user's requirements, and provide information for accounting purposes (e.g. metering calls). In addition to these basic functions, the IP-PBX module 114 may offer many other calling features and capabilities.

Data session handling engine 116 enables handling of data sessions through the residential gateway 100 such as the transfer of a data session from one communication device to another. Details of data session handling engine 116 will be described further below with respect to FIG. 3.

In one embodiment, residential gateway 100 further includes a DECT base station 120, a broadband modem/router 130, and a Voice over Internet Protocol (VOIP) adapter 140 with foreign exchange station (FXS) ports. DECT base station 120 may include a VOIP extension to provide telephone service over the broadband connection. In one embodiment, a DECT cordless phone handset 122 can connect wirelessly to residential gateway 100 through DECT base station 120. A PSTN telephone 142 may connect to residential gateway 100 through VOIP adapter 140.

Figure 2:
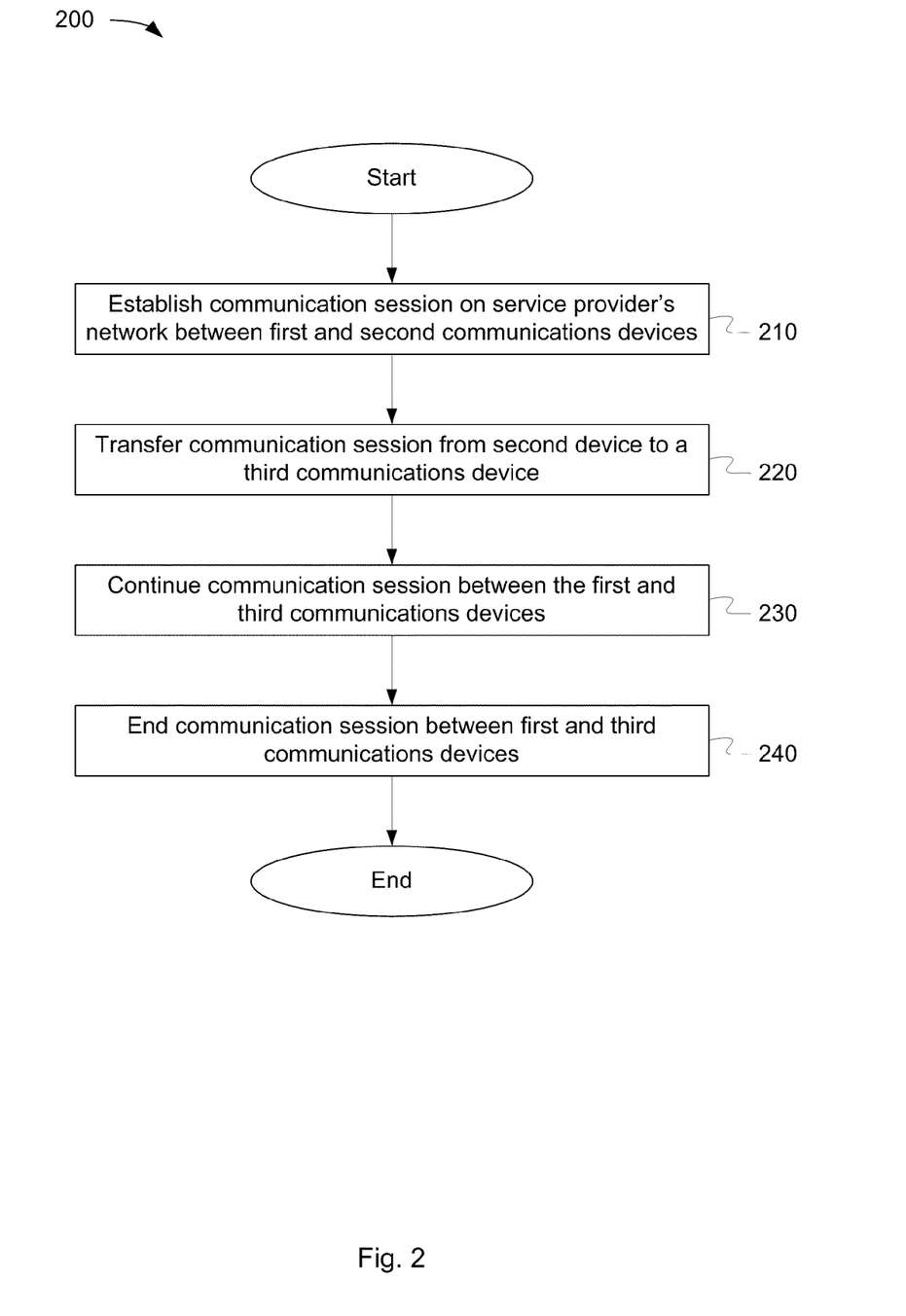
FIG. 2 is a flow chart illustrating a method of data session handling according to an embodiment.

FIG. 2 is a flow chart illustrating a method 200 of data session handling according to an embodiment of the present invention. The method 200 may be performed by processing logic (e.g., engines and modules) that may comprise hardware (e.g., circuitry, dedicated logic, programmable logic, microcode, etc.), software (such as instructions run on a processing device), firmware, or a combination thereof. In one embodiment, method 200 is performed by data session handling engine 116, as shown in FIG. 1. The data session handling method 200 described herein may be used to transfer a data session from one communication device to another communication device.

Referring to FIG. 2, at block 210, method 200 establishes a communication session on a service provider's core network between a first communication device and a second communication device. The first communication device may be, for example, a mobile cell phone or other device connected to the service provider's network, but not connected to the residential gateway 100. The second communication device may be any communication device, such as UMTS handset 118 or DECT handset 122, connected to the residential gateway 100. In one embodiment, the communication session may be a data session including data such as SMS messages, multimedia messaging service (MMS) messages, caller ID information, or other data traffic. In alternative embodiments, the communication session may be a voice session, a video session, or some other type of session.

In one embodiment, the communication session may be conducted over a circuit switched communication network. In a circuit switched network, dedicated network resources are allocated at the establishment of the connection and released when the connection is terminated. Thus, in one embodiment, a dedicated connection may be formed between the first communication device and the second communication device involved in the communication session. This dedicated connection may include a dedicated radio time slot in the frequency channel being used for communication and/or other dedicated resources. A circuit switched network can be distinguished from a packet switched communication network where user information is transported using an autonomous concatenation of bits known as a packet. In a packet switched network, each packet can be routed independently from the previous one, without having specific dedicated resources for the communication session.

At block 220, method 200 performs a session handling function. In one embodiment, method 200 transfers the communication session from the second communication device to a third communication device. The communication session may be transferred within the residential gateway 100, without routing the communication session through the service provider's network. In one embodiment, the third communication device is any other device that is also connected to the residential gateway 100. Details of the data session transfer will be described further below with respect to FIG. 4. In other embodiments, other data session handling actions may be performed. Besides transferring the communication session, method 200 may, for example, enable conferencing between multiple devices associated with the residential gateway 100.

At block 230, method 200 continues the communication session between the first and third communication devices. In one embodiment, data traffic sent from the first device and originally intended for the second device is routed to the third device by data session handling engine 116 in the residential gateway 100. Similarly, data sent from the third device to the first device may be altered to appear as if it is sent from the second device, which was originally the endpoint of the data session.

At block 240, method 200 ends the communication session between the first and third communication devices.

Figure 3:
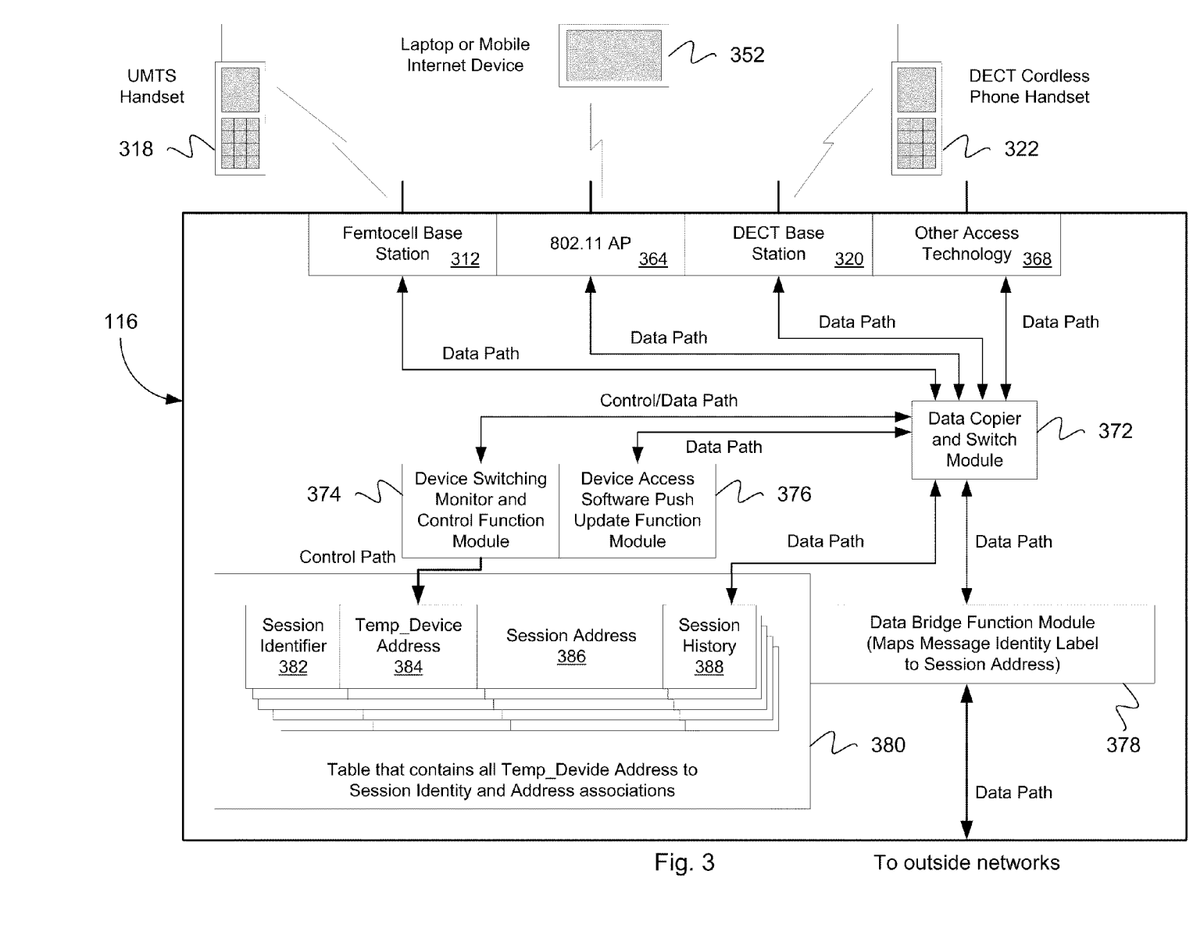
FIG. 3 is a block diagram illustrating a data session handling engine according to an embodiment.

FIG. 3 is a block diagram illustrating a data session handling engine 116 according to an embodiment of the present invention. In one embodiment, data session handling engine 116 includes femtocell base station 312, 802.11 access point 364, DECT base station 320, and other access technology interface 368. In one embodiment, a UMTS handset 318 can connect wirelessly to data session handling engine 116 through femtocell base station 312, a laptop computer or other mobile internet device 352 can connect wirelessly to data session handling engine 116 through 802.11 access point 364, and a DECT cordless phone handset 322 can connect wirelessly to data session handling engine 116 through DECT base station 320. In another embodiment, other communication devices may connect, either with wires or wirelessly, to data session handling engine 116 through interface 368. Other wireless technologies may include, for example, Universal Mobile Telecommunications System (UMTS), CDMA2000, Worldwide Interoperability for Microwave Access (WiMAX), Long Term Evolution (LTE) or other technologies. Other communication devices may include, for example, a mobile Session Initiated Protocol (SIP) phone, a television, camera, or other device having a Wi-Fi client, or another type of computing device.

Data session handling engine 116 may further include data copier and switch module 372. In one embodiment, data copier and switch module 372 is in the data path between interfaces 312, 364, 320, 368 and the other components in data session handling engine 116. Data copier and switch module 372 may function as a switch to route data to the appropriate components such as device switching monitor and control function module 374, device access software push update function module 376, data bridge function module 378 or memory 380. In addition, data copier and switch module 372 may send a copy of data stored in a session history location 388 in memory 380 to the appropriate device (e.g., UMTS handset 318) through one of the interfaces described above.

Device switching monitor and control function module 374 monitors for a unique pattern in the data received from a communication device through data copier and switch module 372. In one embodiment, the unique pattern may indicate a Device Transfer Request. If such a unique pattern is detected, device switching monitor and control function module 374 can overwrite the Temp_Device Address 384 in memory 380 for the particular data session with the device address of the new device indicated by the request. The data session may be identified by session identifier 382 and session address 386, both stored in memory. Session identifier 382 may be a unique identifier to distinguish the data session from all other sessions and session address 386 may indicate the original device involved in the data session before any device transfers occurred. Device switching monitor and control function can also terminate the data session if a unique pattern signaling End of Session is detected.

In one embodiment, data session handling engine 116 may include a device access software push update function module 376. Device Access software push update function module 376 may be, for example, a Java applet or a full application that can upgrade the software on a device to better handle the transferred data session. If a Device Transfer Request is received by data session handling engine 116, device access software push update function module 376 may analyze the device identified in the transfer request and, if necessary, push a software upgrade function to upgrade the device to better handle the data session. The software upgrade can either be done automatically or in some embodiments, the user may be queried about whether they wish to complete the upgrade.

Data session handling engine 116 may also include data bridge function module 378. Data bridge function module 378 maps a Message Identity Label sent with each outgoing data message to the session address 386 stored in memory 380. The result is that the outgoing message appears to have been sent from the original communication device even if the data session has been subsequently transferred to another communication device.

Figure 4:
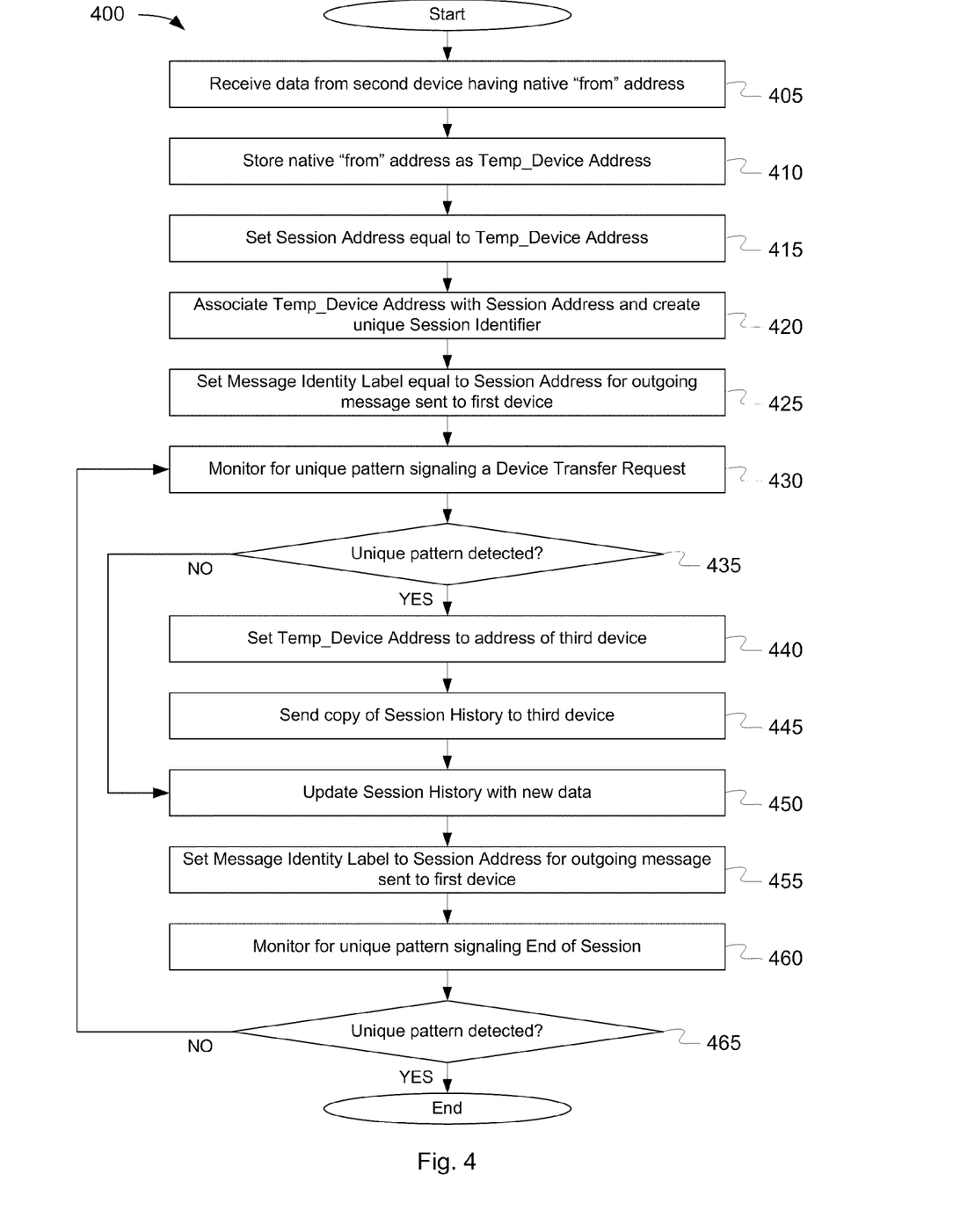
FIG. 4 is a flow chart illustrating a method of data session handling according to an embodiment.

FIG. 4 is a flow chart illustrating a method 400 of data session handling according to an embodiment of the present invention. In one embodiment, method 400 is performed by data session handling engine 116, as shown in FIG. 3. The data session handling method 400 described herein may be used to transfer a data session from one communication device to another communication device.

Referring to FIG. 4, at block 405, method 400 receives data from a communication device associated with the residential gateway 100 at data session handling engine 116. In one embodiment, the communication device may be one of UMTS handset 318, DECT cordless phone handset 322 or laptop or mobile internet device 352. The data received from the communication device may be encoded with a native "from" address, indicating the specific communication device from which it was sent. Initially, the data may be sent and received between the communication device and another device, outside the local network, over the network of a service provider. This network may make use of the licensed spectrum of electromagnetic waves.

At block 410, method 400 stores the native "from" address of the received data in memory 380 at Temp_Device Address location 384. The value at the Temp_Device Address location 384 indicates the communication device that the user is currently using to conduct the ongoing data session. The value at Temp_Device Address location 384 may be changed if the data session is transferred to another communication device, as described below. At block 415, method 400 sets the value at Session Address location 386 in memory 380 equal to the value at Temp_Device Address location 384. The value at Session Address location 386 indicates the address of the original communication device used when the data session was initiated. In one embodiment, the value at Session Address location 386 remains the same for the duration of the data session.

At block 420, method 400 associates the value at Temp_Device Address location 384 with the value at Session Address location 386. In one embodiment, Temp_Device Address location 384 and Session Address location 386 remain linked for the duration of the data session. Method 400 further creates a unique Session Identifier 382 to identify the specific grouping of Temp_Device Address 384 and Session Address 386. Session Identifier 382 can distinguish the particular data session from all other data sessions, including those using the same communication devices.

At block 425, method 400 sets a Message Identity Label equal to the value at Session Address location 386 for an outgoing message sent from the communication device through residential gateway 100. In one embodiment, data bridge function module 378 encodes the Message Identity Label in the data of the sent message with the value from Session Address location 386. The Message Identity Label indicates to the receiving device, where the message was sent from. In one embodiment, the Message Identity Label is set equal to the value at Session Address location 386, so that even if the actual device being used to send the message changes (e.g., through a device transfer), it will appear as if the message was sent from the original communication device. In one embodiment, the outgoing message is stored at Session History location 388 in memory 380.

At block 430, method 400 monitors for a unique pattern signaling a session handling request, such as for example a Device Transfer Request. In one embodiment, the unique pattern is generated by the communication device associated with the residential gateway 100. The unique pattern may be, for example, a dual-tone multi-frequency (DTMF) signal, a voice command, a HyperText Markup Language (HTML) text sequence, or other signal. The unique pattern indicates that the user wishes to transfer the data session having Session Identifier 382 and Session Address 386 away from the original communication device. The unique pattern may also indicate another communication device associated with the residential gateway 100 to which the user wishes to transfer the data session. The method 500 of processing a session handling request will be discussed further below with respect to FIG. 5.

If at block 435, method 400 detects the unique pattern signaling a Device Transfer Request, at block 440, method 400 sets the value at Temp_Device Address location 384 to the "from" address of the new communication device identified by the unique pattern. In one embodiment, the unique pattern is detected by device switching monitor and control function module 374, which also writes the new address to Temp_Device Address location 384. At block 445, method 400 sends a copy of the data stored at Session History location 388 to the new communication device. The data in Session History location 388 may be sent to the communication device through data copier and switch module 372 and the appropriate interface (i.e., femtocell base station 312, 802.11 access point 364, DECT base station 320, or interface 368).

If at block 435, method 400 does not detect a unique pattern signaling a Device Transfer Request, at block 450, method 400 updates the Session History location 388 with any new data. The new data may be any data session messages sent or received since the previous update.

At block 455, method 400 sets the Message Identity Label equal to the value at Session Address location 386 for an outgoing message sent from the new communication device. If the data session has been transferred to a new communication device, the values at Temp_Device Address location 384 and Session Address location 386 no longer match. Even though the actual communication device used by the user has changed since the data session was initiated, in one embodiment, the Message Identity Label sent with each outgoing message is set equal to the address of the original communication device (i.e., the value at Session Address location 386). The device receiving the data message will interpret the message as being sent from the original communication device, and as being part of the same data session. Similarly, any received messages addressed to the original communication device will be routed to the new communication device, identified by the value at Temp_Device Address location 384, by data copier and switch module 372.

At block 460, method 400 monitors for a unique pattern signaling the End of Session. The unique pattern indicates that the user wishes to terminate the data session having Session Identifier 382 and Session Address 386. The unique pattern may be generated as a result of direct user input such as those of the unique pattern signaling a Device Transfer Request. Additionally, the unique pattern may be generated in other ways, such as for example, the time-out of a timer device.

If at block 465, method 400 detects the unique pattern signaling End of Session, method 400 ends. If at block 465, method 400 does not detect the unique pattern signaling End of Session, method 400 returns to block 430 and monitors for a unique pattern signaling a Device Transfer Request.

Figure 5:
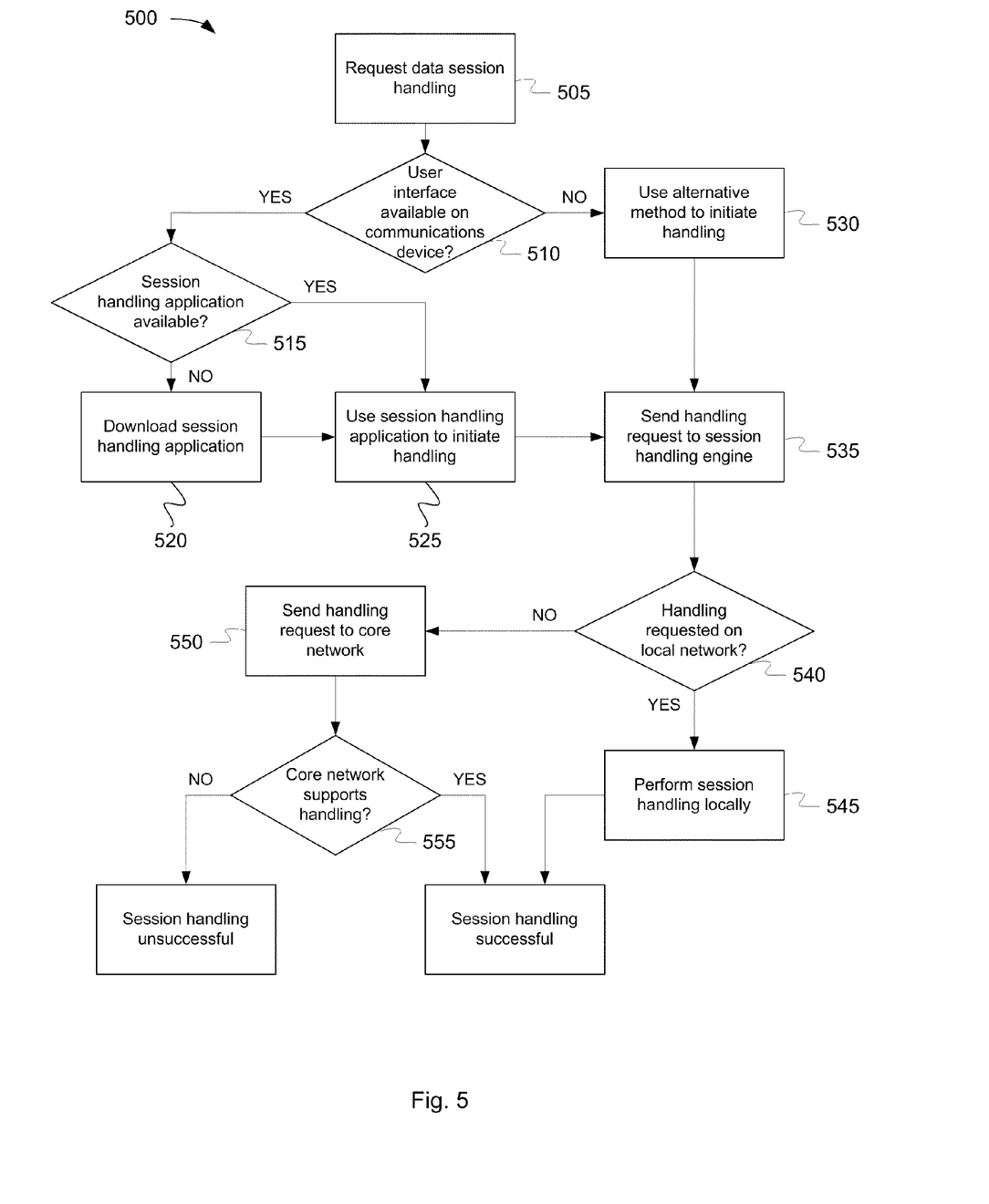
FIG. 5 is a flow chart illustrating a method of processing a data session handling request according to an embodiment.

FIG. 5 is a flow chart illustrating a method 500 of processing a data session handling request according to an embodiment of the present invention. The method discussed in this embodiment is one example of how the system described herein may process a data session handling request. In certain embodiments, selected actions may be built-in to the system, while additional user-specified actions are also supported. In one embodiment, at block 505, method 500 requests data session handling. Data session handling may include, for example, transferring a data session from one communication device to another. In one embodiment, the request for data session handling is made by a unique pattern, such as the unique pattern described at block 430 of FIG. 4.

At block 510, method 500 determines whether a user interface is available on the communication device currently being used by the user. The user interface may include a graphical user interface (GUI) or other display mechanism. If at block 510, method 500 determines that a user interface is available on the communication device, at block 515, method 500 determines whether a session handling application is available on the communication device. A session handling application may include an application running on the communication device, making use of the GUI to provide prompts for initiating the data session transfer and for selecting a new communication device to which the data session may be transferred.

If at block 515, method 500 determines that a session handling application is not available, at block 520, method 500 downloads a session handling application. The session handling application may be downloaded over a wired or wireless broadband or cellular network connection. If at block 515, method 500 determines that a session handling application is available, at block 525, method 500 uses the session handling application to initiate session handling.

If at block 510, method 500 determines that a user interface is not available on the communication device, at block 530, method 500 uses an alternative method to initiate session handling. In one embodiment, the alternative method may be a key sequence, a voice command or other unique pattern. At block 535, method 500 sends the session handling request to the data session handling engine 116 of residential gateway 100.

At block 540, method 500 determines whether the handling request is among communication devices associated with the local network of the residential gateway 100. If at block 540, method 500 determines that the handling request is to transfer to another communication device associated with the residential gateway 100 (e.g., from UMTS handset 318 to DECT handset 322), at block 545, method 500 handles the session locally. The method 400 of data session handling is described above with respect to FIG. 4.

If at block 540, method 500 determines that the handling request is not on the local network, at block 550, method 500 sends the session handling request to the service provider's core network. At block 555, method 500 determines whether the service provider's core network supports the session handling request. If at block 555, method 500 determines that the core network supports the session handling request, the session handling is successful. If at block 555, method 500 determines that the core network does not support the session handling request, the session handling fails.

Figure 6:
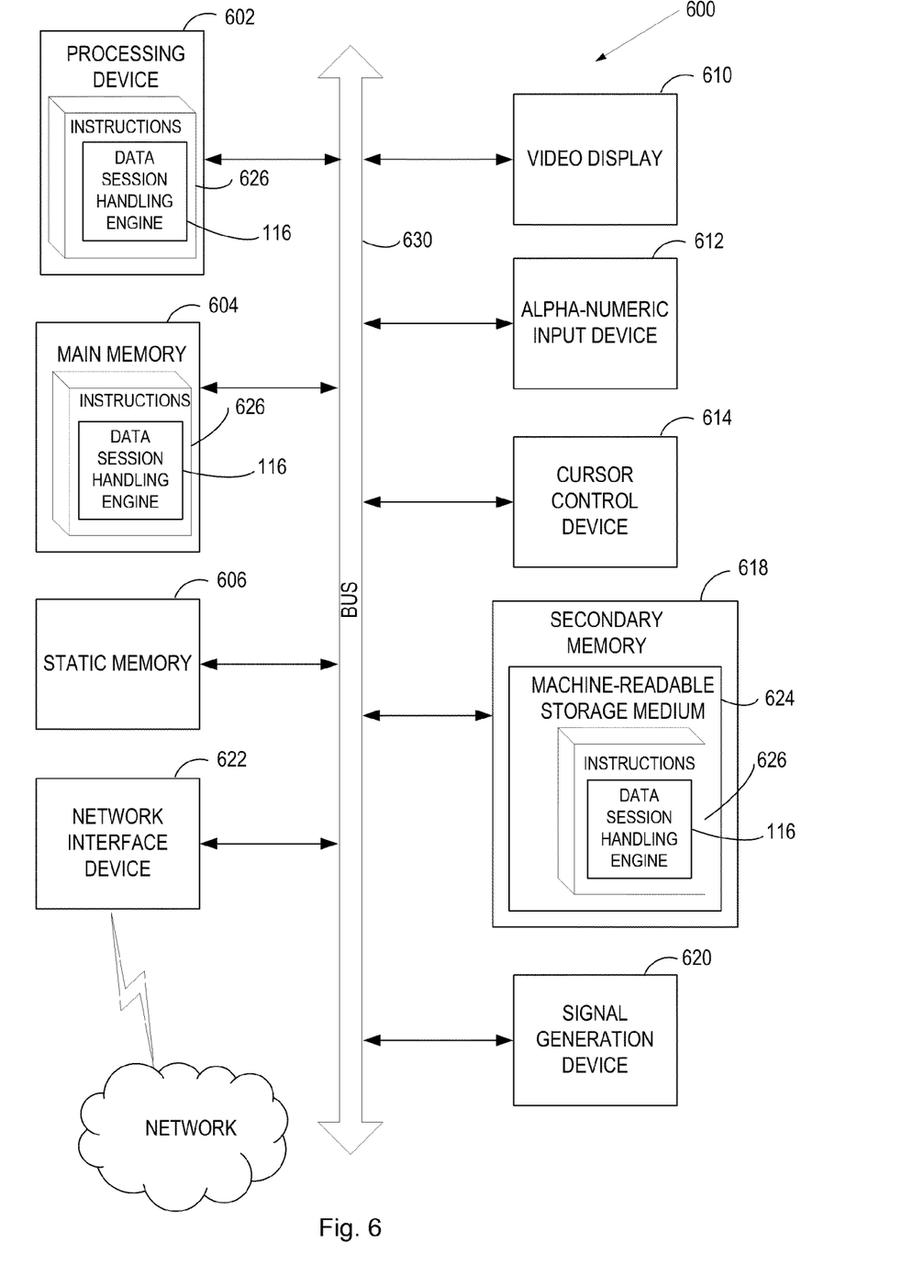
FIG. 6 is a block diagram illustrating a machine in the exemplary form of a computer system according to an embodiment.

FIG. 6 is a block diagram of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may be a personal computer (PC), a tablet PC, a set-top box (STB), a Personal Digital Assistant (PDA), a cellular telephone, a web appliance, a server, a network router, switch or bridge, a UMTS handset, a DECT cordless phone handset or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 618 may include a machine-readable storage medium (or more specifically a computer-readable storage medium) 624 on which is stored one or more sets of instructions 626 (e.g., software) embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

The machine-readable storage medium 624 may also be used to store the data session handling engine 116 of FIG. 3, and/or a software library containing methods that call the data session handling engine 116. While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing devices described herein may include one or more general-purpose processing devices such as a microprocessor or central processing unit, a controller, or the like. Alternatively, the processing device may include one or more special-purpose processing devices such as a digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   establishing a communication session comprising data on a service provider's network between a first communication device and a second communication device; and
   transferring, by a residential gateway, the communication session comprising the data from the second communication device to a third communication device without routing the communication session through the service provider's network; the establishing comprises storing a native address of the second communication device in a memory as a temporary device address, setting a session address in memory equal to the stored temporary device address and associating the temporary device address with the session address in memory; detecting a unique pattern signaling a transfer request and wherein the transferring further comprises setting the temporary device address in memory to a native address of the third communication device.

2. The method of claim 1, wherein the temporary device address in memory is set by a device switching monitor and control function module of a data session handling engine in the residential gateway.

3. The method of claim 1, wherein the transferring further comprises sending a copy of a session history stored in memory to the third communication device.

4. The method of claim 3, wherein the transferring further comprises routing data intended for the second device to the third device identified by temporary device address in memory.

5. The method of claim 1, further comprising mapping, by a data bridge function module of a data session handling engine in the residential gateway, a message identity label in an outgoing message to the value stored in memory at the session address location.

6. The method of claim 1, further comprising terminating the communication session between the first device and the third device.

7. The method of claim 1, wherein the data comprises any communication information other than voice.

8. The method of claim 1, wherein the data comprises at least one of a short message service (SMS) message, a multimedia messaging service (MMS) message, and caller ID information.

9. The method of claim 1, wherein the communication session comprising data is established on a circuit switched communication network.

10. The method of claim 1, wherein the first second and third communication devices comprise at least of one of a Universal Mobile Telecommunications System (UMTS) handset, a Digital Enhanced Cordless Telecommunications (DECT) handset and a computer.

11. The method of claim 1, wherein the service provider's network operates in a licensed spectrum.

12. The method of claim 1, wherein the residential gateway operates in an unlicensed spectrum.

13. The method of claim 1, wherein the communication session comprising the data is transferred by a data copier and switch module of a data session handling engine in the residential gateway.

14. A data session handling engine appratus, comprising:
a first communication interface to communicatively couple a first communication device to the data session handling engine;
a second communication interface to communicatively couple a second communication device to the data session handling engine;
a memory to store a temporary device address location and a session address location; and
a data copier and switch module coupled between the first and second communication interfaces and the memory, the data copier and switch module to transfer a communication session comprising data from the first communication device to the second communication device and wherein the apparatus further comprises a device switching monitor and control function module coupled to the data copier and switch module and to memory, the device switching monitor and control function module monitor for a unique pattern in data received from the first and second communication devices and write a device address into memory at the temporary device address location.

15. The apparatus of claim 14, wherein the data copier and switch module is configured to transfer the communication session without routing the communication session through a service provider's network.

16. The apparatus of claim 15, wherein the data comprises any communication information other than voice.

17. The apparatus of claim 14, wherein the memory further comprises a session history location.

18. The apparatus of claim 14, wherein the unique pattern is configured to signal a device transfer request.

19. The apparatus of claim 14, further comprising a device access software push update function module coupled to the data copier and switch module, the device access software push update function module to push a software update to the second communication device.

20. The apparatus of claim 14, further comprising a data bridge function module coupled to the data copier and switch module, the data bridge function module to map a message identity label in an outgoing message to the value stored in memory at the session address location.

21. A computer readable storage medium including instructions that, when executed by a processing system, cause the processing system to perform a method comprising:
establishing a communication session comprising data on a service provider's network between a first communication device and a second communication device; and
transferring, by a residential gateway, the communication session comprising the data from the second communication device to a third communication device, the transferring comprises transferring the communication session within the residential gateway without routing the communication session through the service provider's network and wherein the establishing comprises:
storing a native address of the second communication device in a memory as a temporary device address;
setting a session address in memory equal to the stored temporary device address; and
associating the temporary device address with the session address in memory.

22. The computer readable storage medium of claim 21, wherein the transferring further comprises:
setting the temporary device address in memory to a native address of the third communication device in response to receiving a device transfer request;
sending a copy of a session history stored in memory to the third communication device; and
routing data intended for the second device to the third device identified by temporary device address in memory.

23. A. method comprising:
establishing a communication session comprising data on a service provider's network between a first communication device and a second communication device;
storing a native address of the second communication device in a memory as a temporary device address;
setting a session address in memory equal to the stored temporary device address;
associating the temporary device address with the session address in memory;
receiving a request to transfer the communication session comprising data from the second communication device to a third communication device, wherein the second and third communication devices each comprise at least one of a Universal Mobile Telecommunications System (UMTS) handset and a Digital Enhanced Cordless Telecommunications (DECT) handset;
setting the temporary device address in memory to a native address of the third communication device; and
routing, within a residential gateway, data from the communication session intended for the second device to the third device identified by temporary device address in memory.

* * * * *